United States Patent [19]

Kawakatsu et al.

[11] Patent Number: 5,119,367
[45] Date of Patent: Jun. 2, 1992

[54] METHOD AND A NODE CIRCUIT FOR ROUTING BURSTY DATA

[75] Inventors: Masami Kawakatsu; Kyoichi Nakamaki, both of Tokyo, Japan

[73] Assignee: Oki Electric Industry Co., Ltd., Tokyo, Japan

[21] Appl. No.: 426,275

[22] Filed: Oct. 25, 1989

[30] Foreign Application Priority Data

Oct. 28, 1988 [JP] Japan .................................. 63-270748

[51] Int. Cl.⁵ .......................................... H04Q 11/04
[52] U.S. Cl. .................................... 370/54; 370/94.1; 370/60
[58] Field of Search ........................ 370/60, 54, 94.1; 364/200 MS File, 900 MS File

[56] References Cited

U.S. PATENT DOCUMENTS

| | | | |
|---|---|---|---|
| 4,550,397 | 10/1985 | Turner et al. | 370/60 |
| 4,551,833 | 11/1985 | Turner | 370/60 |
| 4,611,322 | 9/1985 | Larson et al. | 370/60 |
| 4,799,215 | 1/1989 | Suzuki | 370/60 |

OTHER PUBLICATIONS

Kulzer, J. J. and Montgomery, W. A., "Statistical Switching Architectures for Future Services," ISS '84 Florence, May 7-11, 1984, session 43, pp. 1-6.

Primary Examiner—Thomas M. Heckler
Attorney, Agent, or Firm—Spencer, Frank & Schneider

[57] ABSTRACT

A node circuit for connecting a plurality of input lines to a plurality of output lines in a packet switching system. The circuit includes a switching network whose connections are stored as a link table whose entries are determined by a traffic control device based on estimated traffic information included in a signalling packet provided at the initial stage of a call. The traffic control device is coupled to the switching network through a switching control device. The traffic control device computes a necessary available traffic carrying capacity of an output line to be selected for the call. The device compares this value to the actual available traffic carrying capacity of the output lines which lead to the destination terminal to determine the most appropriate output line and stores the result in the link table. A traffic counting device is also provided in order to obtain a count of the actual traffic of the call, this count is then utilized as a replacement for the estimated traffic information by the traffic control device in determining the entries of the link table when a subsequent call from the same origination terminal to the same destination terminal and with the same estimated traffic information is received by the node circuit.

8 Claims, 10 Drawing Sheets

| MAXIMUM BIT RATE | ADDRESS |
|---|---|
| ----- | ----- |

| AVERAGE BIT RATE | EFFECTIVE BIT RATE |
|---|---|
| ----- | ----- |

EFFECTIVE BIT RATE TABLE

MAXIMUM BIT RATE TABLE

Fig. 3(b)

| DESTINATION ADDRESS | ADDRESS |
|---|---|
| ----- | ----- |

| A | B | C |
|---|---|---|
| | ......... | |

DESTINATION TABLE

CHARACTERISTIC TABLE

METHOD AND A NODE CIRCUIT FOR ROUTING BURSTY DATA

BACKGROUND OF THE INVENTION

1. Reference to Related Applications

This application claims the priority of Japan application No. 63,270748 filed Oct. 28, 1988, which is incorporated herein by reference.

2. Field of the Invention

This invention relates to a method and a node circuit of a packet switching system for the routing of packets, and relates particularly to a method and a node circuit for routing a bursty data transmission.

3. Description of the Related Art

An example of a packet communication system which has been previously proposed to handle bursty data in multimedia information communications is described in "Statistical Switching Architecture for Future Services" ISS' 84 (May 1984). This system features a simple communication protocol and a self-routing method.

However, the previously proposed system is merely a kind of routing apparatus which depends for its routing instructions only on the routing information (address) included in the packets.

Therefore, the system does not take into account the conditions of the transmission links and does not transmit or interpret information concerning the packets themselves. Accordingly, it cannot prevent loss of packets caused by an overflow of switching buffers.

Generally, when such bursty data is transmitted in multimedia information communications, the buffer will overflow and packets will be lost, resulting in a reduction in the quality of communication, because bursty data transmissions have the specific characteristics described below:

Generally, the terms "bursty data transmission" and "bursty messages" mean a series of alternating continuous transmissions of significant data separated by pauses or non-significant data transmissions.

For example, when transmitting a message in the form of a moving image (i.e. video transmission), first an initial transmission of data for an entire image (a continuous data transmission) will be sent, and after that, a stream of short bursts of data representing successive changed portions of the image, which are overwritten on the initial entire image, will be sent to realize an efficient data transmission.

In a multimedia communication system capable, for example, of a voice data transmission or an image data transmission or both, especially in a case of transmitting moving images, such bursty data transmission is often used to reduce the total amount of data transmission by eliminating redundancy in the transmitted data.

Figure 1A:
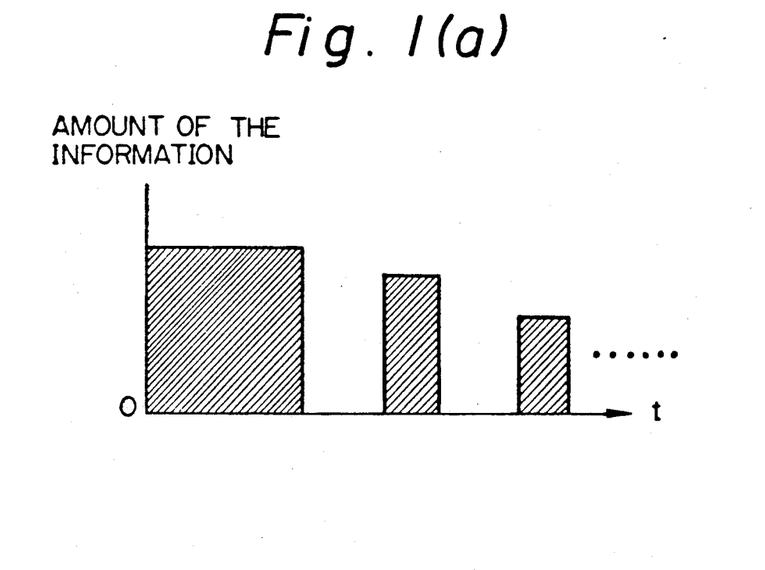
FIGS. 1(a), 1(b) and 1(c) are graphical representations of transmitted data for use in explaining bursty data transmissions.
Figure 1B:
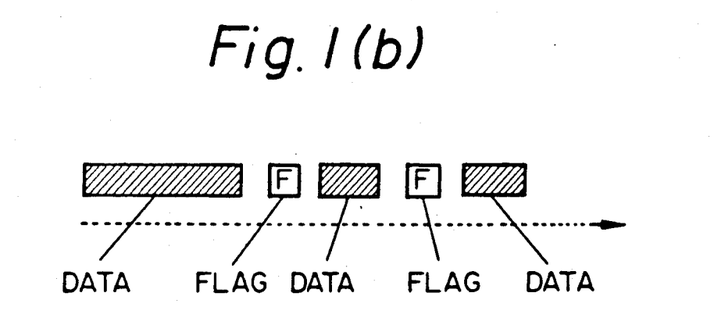
Figure 1C:
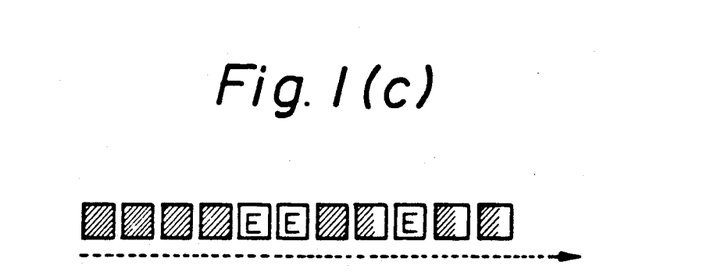

FIGS. 1(a), 1(b) and 1(c) illustrate a bursty data transmission and two different forms of corresponding packets used to transmit the produced data. As shown in FIG. 1(a), first a long block of data high in information content is produced, and then, a stream of shorter, less dense blocks of data with pauses interposed therebetween is produced. If the data is transmitted in a variable length packet form, special flag packets representing no data transmission are transmitted during the pauses between data packets, as shown in FIG. 1(b). If the data is transmitted in a fixed length packet form, an empty packet which has fixed length, but with no significant data content, is transmitted during each pause.

Generally, the transmission characteristics of the required transmission path are determined by the required maximum transmission speed, and in many cases this depends on the speed needed to transmit the above-mentioned initial continuous data. If the transmission path is designed merely to carry data at an estimated average transmission speed, the buffer may overflow during the initial continuous data transmission if the actual average transmission speed is greater than the estimated average transmission speed.

On the other hand, since there are many pauses during data transmission of a bursty message, if the transmission path is merely designed to carry data at the maximum transmission speed so as to transmit the initial continuous data, the efficiency of transmission will be wasteful and the system will be more expensive than necessary.

OBJECTS AND SUMMARY OF THE INVENTION

An object of the invention is to provide a node circuit of a packet switching system which is able to measure input packet traffic and select the most appropriate output line, to thereby optimize the overall transmission efficiency.

Another object of the invention is to provide a node circuit which reduces the number of packets lost due to overflow of the switching buffers, by means of a simple routing method according to the invention.

A further object of the invention is to provide a node circuit which is capable of handling multimedia information which includes bursty data.

According to the invention, at least one of a plurality of input lines to the node circuit is connected to an originating packet terminal which transmits packets of bursty data. The node circuit includes (1) a switching network connected to the input lines and to output lines for transferring inputted packets to an output line selected on the basis of header information, which is capable of storing information identifying a combination of a predetermined input line and a predetermined output line, (2) a switching control device for controlling the switching network, and (3) a traffic control device connected to the switching control device, which performs the following functions:

(a) receiving traffic information of a call, concerning an estimated rate of data transmission i.e., the bit rate, on an input line from the packet origination terminal connected thereto, when the terminal places the call through the input line;

(b) computing the traffic carrying capacity of an output line necessary to carry the call, based on the traffic information;

(c) selecting an output line which has enough traffic capacity to carry the call among a plurality of the output lines connected to the node, based on the result of the above computation; and, (d) controlling the switching control device to input to the switching network, a combination of the input line and the selected output line to be stored in a link table therein.

Further, the invention has traffic counting devices each of which counts actual traffic in a unit time of a call. Each traffic control device stores the result of the count during a predetermined time interval and adjusts the stored traffic information for use in changing the selected output line for a later call.

According to the invention, at the beginning of forming a communication path for a call, each node circuit can select the most preferred output line which has available traffic capacity to accept the call. Therefore, as the throughput of the node circuits rise, the loads of the various output lines are distributed so that a satisfactory communication path which accepts bursty data communication can be established. For example, the invention can be applied to a packet switching station which serves video image data transmissions, voice data transmissions, or other high speed bursty data transmissions with greater accuracy and efficiency than prior node circuits.

DESCRIPTION OF THE PREFERRED EMBODIMENTS

Figure 2A:
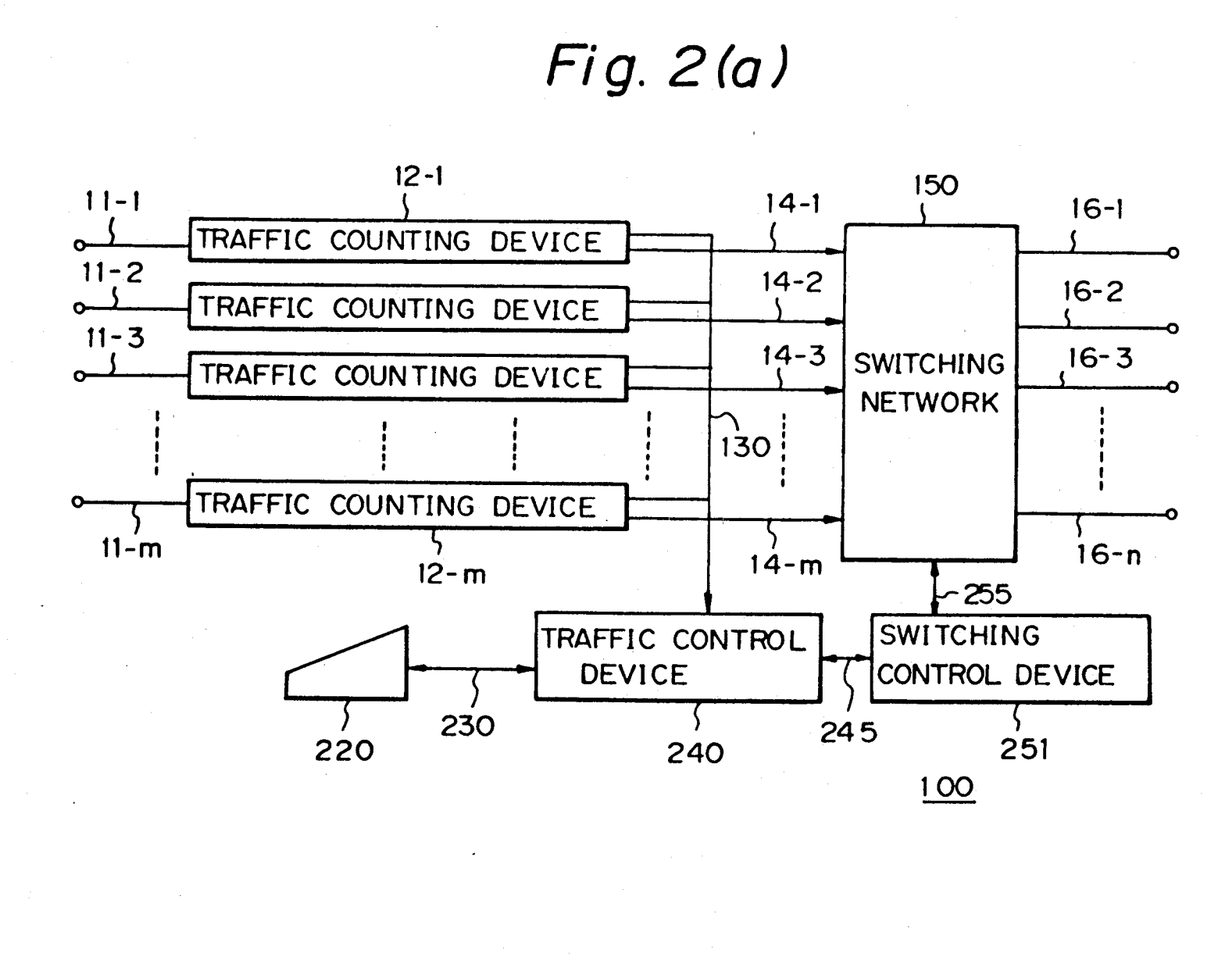
FIG. 2(a) is a general block diagram of a node circuit according to a preferred embodiment of the invention.

FIG. 2(a) is a general block diagram of a preferred embodiment of the node circuit of the invention.

The node circuit 100 has traffic counting devices 12-1 to 12-m which are respectively connected at their input ports to input lines 11-1, 11-2, 11-3, . . . 11-m. These input lines connect packet origination terminals (not shown in FIG. 2(a)) which output bursty data transmissions (messages), either directly or through other node circuits according to the invention, to the traffic counting devices.

The traffic counting devices, which count numbers of bits, or packets if the packets are of fixed length, in time intervals of predetermined length, are also connected at their output ports to a known switching network 150 (such as the switching module disclosed in Japanese kokai publication 169850/88, published on Jul. 13, 1988) via communication lines 14-1, 14-2, 14-3, . . . 14-m. As used hereinafter, the term "communication line" encompasses a mono or bidirectional transmission line and a virtual transmission line, such as a time multiplex channel and a bus line. Further, the traffic counting devices are connected to a traffic control device 240 via communication lines 130.

The communication lines 14-1, 14-2, 14-3, . . . 14-m are provided for transferring packets from the input lines to the switching network 150, and the communication line 130 provides the counts of traffic of each input line from the respective counting devices to the traffic control device 240.

The switching network 150 receives packets from the input communication lines 14-1 to 14-m, recognizes destination information of each packet, and transfers the packets to the appropriate output lines 16-1, 16-2, 16-3, . . . 16-n. The packets are transferred according to the connections of the input and output lines as initially instructed by a known switching control device 251, such as the processing circuit (MP and PS) provided in the switching module disclosed in Japanese kokai publication 169850/88, published on Jul. 13, 1988, via communication line 255. The connections are subsequently stored in the memory of the switching network as will be described below.

The switching control device 251 is controlled by the traffic control device 240 via communication line 245. Further, the traffic control device 240 is connected to a terminal 220 for providing overall control of the node circuit via communication line 230. The terminal 220 is used for providing initialization or bootstrap data to the node circuit, or for providing special instructions to the node circuit, which are not included in built-in control software within the traffic control device.

Although not shown in the drawings, all of the elements of the node circuit, except the traffic control device 240 and the terminal 220, may be provided in duplicate for backup in case of a failure.

Figure 2B:
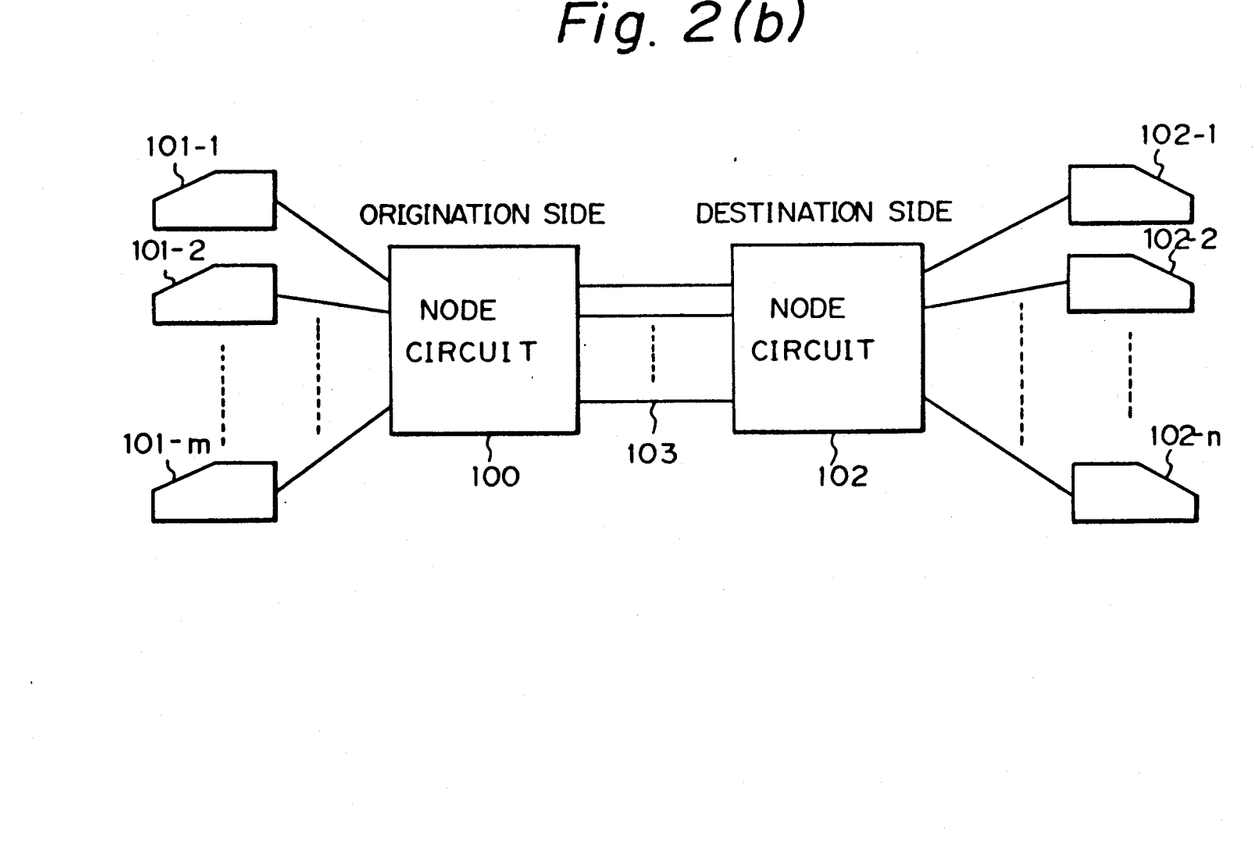
FIG. 2(b) illustrates an example of a connection between two node circuits.

FIG. 2(b) illustrates an example of a structure of a communication path to which the invention is applied. In this figure, a plurality of packet terminals 101-1, 101-2, and 101-m are connected to a node circuit 100 at the origination side and the node circuit 100 is connected to another node circuit 102 at the destination side via communication lines 103. A plurality of packet terminals 102-1, 102-2, 102-n are connected to the node circuit 102. Of course, normally other node circuits (not shown) would be present on the communication lines 103 and other input lines or output lines could be connected to the node circuits 100 and 102.

Before describing in greater detail the structure of the node circuit, the general functions of the node circuit will be described with reference to FIGS. 3(a), 3(b), 5, 6(a) and 6(b).

According to a standard process of sending "Virtual Call" data in a packet communication, in a first phase of making a call from a packet origination terminal, a "CR" (Call Request) packet which includes a destination address, is sent to a packet destination terminal, and in a second phase, a "CA" (Call Acknowledge) packet is returned from the destination terminal to inform the packet origination terminal of the acceptance of the data transmission. During those CR and CA packet transmissons, every communication node circuit (or switching station) on the transmission path between the origination and destination terminals memorizes in its link memory a combination of the input line and the output line used in the transmission through that node circuit.

According to the invention, the conventional "CR" packet is modified. The modified CR packet is a signaling packet transmitted at the first stage of establishing a transmission path for transmitting bursty data, which includes data for a call specifying at least (1) a destination address of the call, based, for example, on CCITT recommendation E.164, (2) a maximum bit rate of the call (reflecting the maximum transmission speed capability of the data source at the origination packet terminal) and (3) an estimated average bit rate of the call, also based on the capability of the data source. The bit rate information for the signaling packet can easily be computed and prepared in signal form in the packet origination terminal, by means of a conventional technique. For example, the maximum throughput of the packet origination terminal could be the maximum bit rate, and a product of the maximum throughput and an appropriate factor Q ($0<Q<1$) could be the estimated average bit rate.

Figures 3A, 3B:
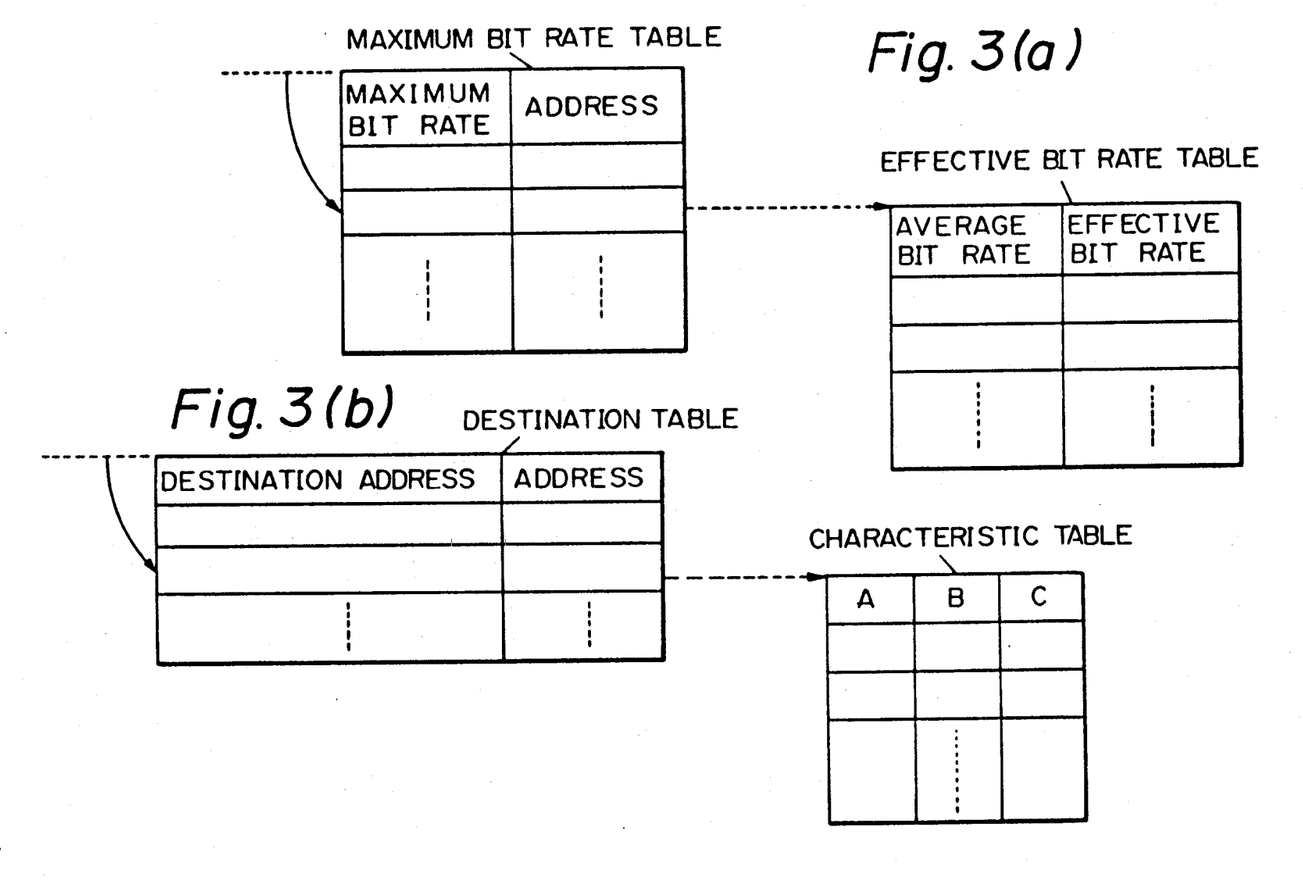
FIGS. 3(a) and 3(b) illustrate tables for storing and accessing traffic information, used for routing packets according to the method of the invention.

FIGS. 3(a) and 3(b) illustrate how the traffic control device 240 of the node circuit of the invention treats destination address information and maximum average bit rate information in the memory of the traffic control device to select which output line to connect to an input line in order to define a portion of a communication path between an origination terminal and a destination terminal.

As shown in FIG. 3(a), when the traffic control device receives from the origination terminal a signaling packet specifying the maximum bit rate and the estimated average bit rate, it first looks up the maximum bit rate in a maximum bit rate table to find an address of a corresponding effective bit rate table. In the preferred embodiment, the traffic control device stores several maximum bit rate tables and one is selected according to the address of the origination packet terminal in the signaling packet, based on the maximum bit rate capability of the origination terminal from which the call originated. Alternatively, it could be possible to prepare a single maximum bit rate table for common use with respect to all calls at the node. The maximum bit rate table stores addresses of effective bit rate tables which correspond to the respective maximum bit rates in the table. The traffic control device selects a maximum bit rate entry in the maximum bit rate table corresponding to the maximum bit rate specified in the signaling packet, which rate is normally based on the data source being used at the origination packet terminal. The address associated with the selected maximum bit rate is used to locate and look up the address of the estimated average bit rate in the corresponding effective bit rate table.

The associations of the effective bit rates and estimated average bit rates in the effective bit rate table are such that the effective bit rates have values greater than the associated estimated average bit rate and less than the maximum bit rate.

The exact associations are determined in consideration of the buffer capacity of the node and so as to effectively compromise between a rate which is certain to pass through all data on the input line, but is inefficient when the actual average bit rate is low, and the estimated average bit rate, which may result in overflow and loss of data at the buffer, particularly when the maximum bit rate and the actual average bit rate are much higher than the estimated average bit rate.

For example, in a case of a long data interval characterized by low speed and low density bursty data transmission, the maximum bit rate and the estimated average bit rate will be almost the same, and the corresponding effective bit rate will have a value close to these. However, if a call is initially a short interval of highly concentrated data, the maximum bit rate will be correspondingly high and it will greatly exceed the estimated average bit rate. In this case, which is to be expected for video transmissions, the effective bit rate will be between the maximum bit rate and the estimated average bit rate in order to provide a compromise between the contradictory requirements of avoiding buffer overflow and maintaining high traffic efficiency.

Next, as illustrated in FIG. 3(b), the traffic control device reads the destination address and looks it up in a destination table. The contents of the destination table are addresses of the tops of characteristic tables which provide transmission rate characteristics of all available output transmission lines for directing the call to the destination terminal. In general, a plurality of such output lines are assigned to the same destination address to avoid overcrowding and to provide for emergency transmission, and they are put in a predetermined order of priority in the characteristic table. In the characteristic table, the values "A" are maximum transmission rates of the respective available output lines, which lines have line numbers "C". The values A are fixed values. The values "B" are transmission rates currently being used on the lines "C". In order to select output lines "C" to connect to input lines and rewrite the values "B" to reflect corresponding increases in the transmission rates on these output lines, the following steps are performed:

The traffic control device computes the difference between "A" and "B" for every output line in the characteristic table and then searches in order of priority in the characteristic table for the first output line whose difference "A" minus "B" is greater than the effective bit rate previously determined for the call. When such an output line is identified, the traffic control device directs that a combination of a line number of the input line which sent the signaling packet and the line number "C" of the identified output line, be stored in a link memory of the switching device and further, replaces "B" with the sum of "B" and the effective bit rate, in the characteristic table.

All of the above mentioned tables can be loaded by appropriate conventional loading software provided in the traffic control device 240, or if necessary, can be loaded from the terminal 220.

In this way, the most appropriate output line which has a sufficient available bit rate capacity is selected and the succeeding data transmission of the call is executed according to the contents of the link memory, similarly to a usual "Virtual Call" data transmission.

The details of this selection process depend somewhat on the format of the packets used in data transmission. Two such packet formats, both of which may be used in accordance with the invention, are described below.

Figure 4A:
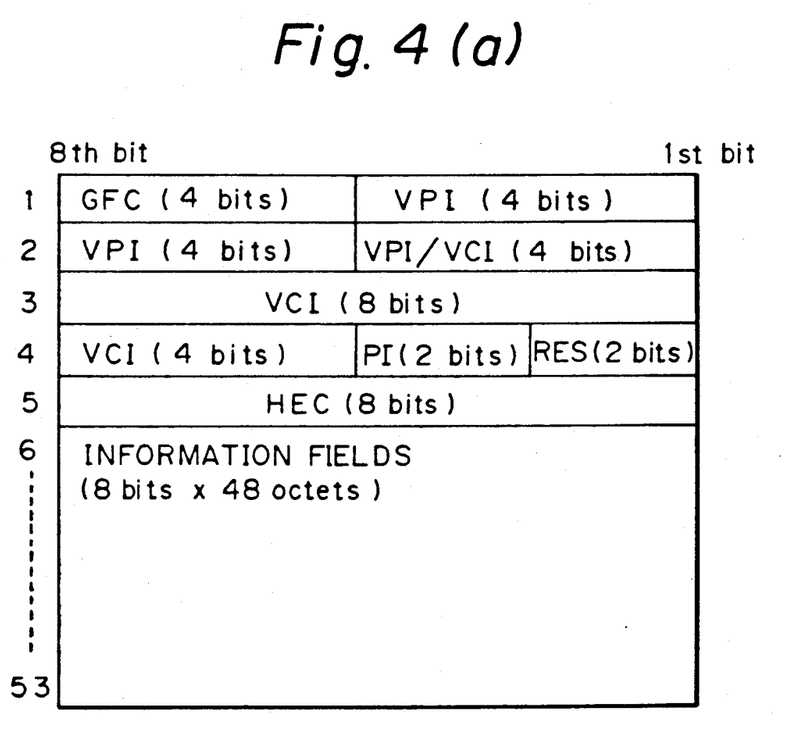
FIGS. 4(a) and 4(b) illustrate packet formats which are applicable to the invention.
Figure 4B:
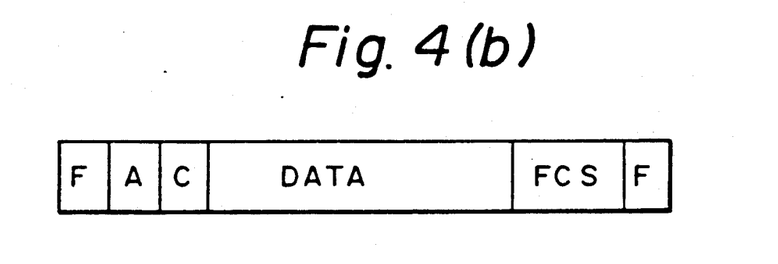

The node circuit of the invention can be applied, with some differences in the traffic counting devices, to both variable and fixed length packets. FIGS. 4(a) and 4(b) show respective examples of known packet formats.

FIG. 4(a) is an example of fixed length cell (packet) structure (format) based on a CCITT recommendation plan. In this drawing, GFC stands for "General Flow Control", VPI stands for "Virtual Path Identifier", VCI stands for "Virtual Channel Identifier", PT stands for "Payload Type", HEC stands for "Header Error Control", and RES stands for "Reserved".

This packet structure comprises five octets (one octet equals eight bits) of header information and 48 octets of data information. If it is an empty cell, the value of the VPI is equal to "0" and the contents of the information field will not be treated in the node circuit and the cell will be discarded.

Further, if a packet is used to perform a signaling function according to the invention, the 12-bit sequence of the VCI in the packet will have a predetermined pattern. For example, for a packet having a call request function, VCI="010000100101", and for a packet having a call acknowledge function, VCI="100000010101".

FIG. 4(b) is an example of a variable length packet format based on an HDLC (High Level Data Link) standard. In this structure, "F" is an 8-bit flag sequence "01111110" utilized as a delimiter between successive packets. "A" is an 8-bit destination address and "C" is an 8-bit control field. FCS stands for "Frame Check Sequence" and is utilized for error correction of the transmitted data. The length of the data is variable up to 4096 octets.

If there is no data to transmit during a particular time interval of the call, only the flag sequence is transmitted by the packet origination terminal within the time interval to maintain the continuity of the call.

However, transmitted packets whose contents are only the flag sequences need not be transmitted beyond the first node circuit. Therefore such packets will not include a pattern indicating that its bits should be counted by the counting device as described below, and are discarded by the switching network.

Further, for variable length packet transmissions according to the HDLC standard, if a packet is used to perform a signaling function, it is an "I" frame packet which has a predetermined 4-bit pattern identifying a Logic Channel Group Number (LCGN) and an 8-bit Logic Channel Number (LCN), both in the DATA field thereof. Generally, each call is identified by a combination of an LCGN and an LCN (which correspond to the VCI of the above described fixed length packet format).

Figure 5:
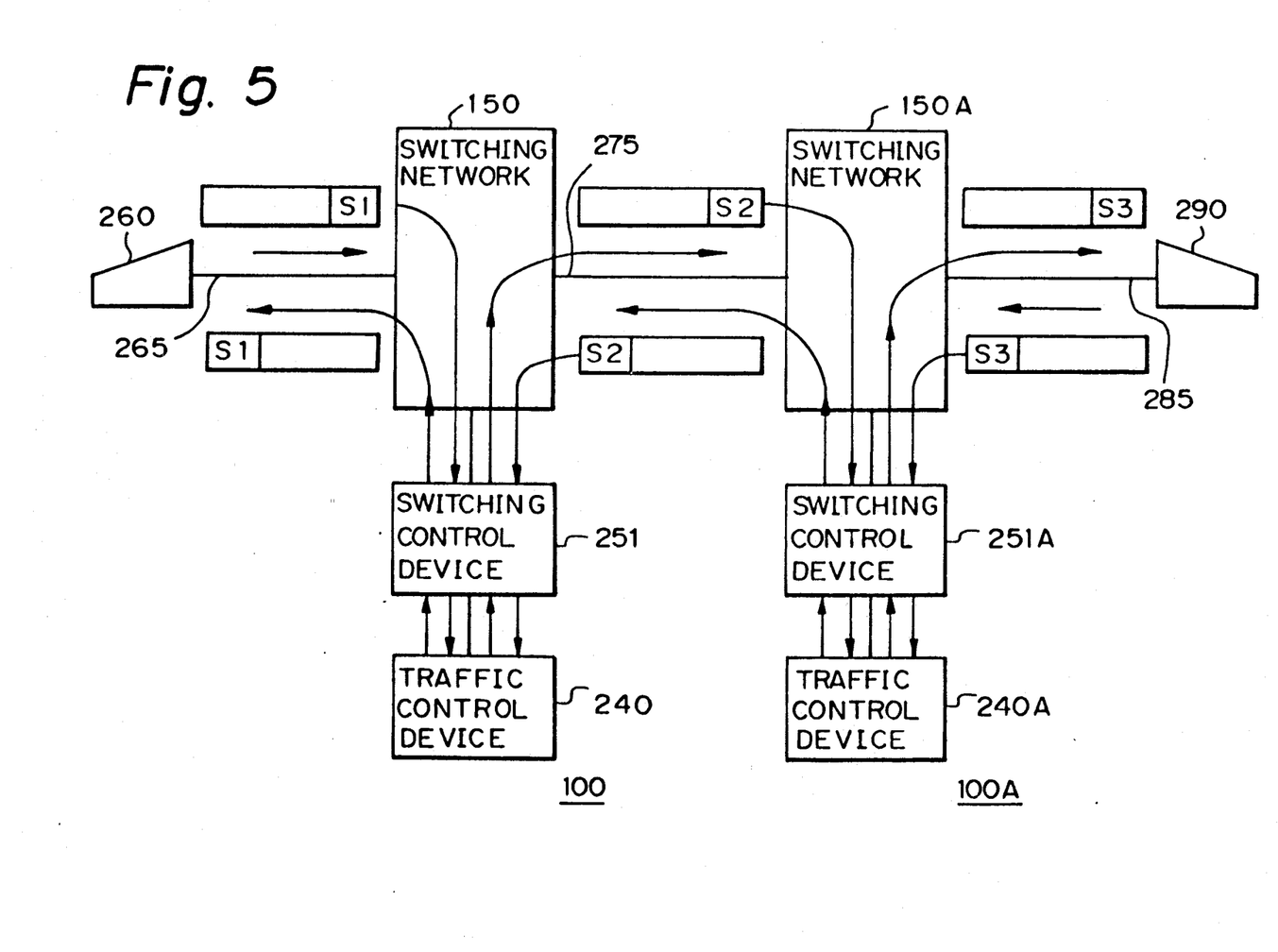
FIG. 5 is a data flow diagram illustrating data flow within node circuits according to the invention.

FIG. 5 illustrates the flow of a signaling packet in a pair of successive node circuits of the invention when a packet origination terminal 260 is making a call to a packet destination terminal 290. Only single input and output lines and no traffic counting devices are shown, for simplicity of illustration.

For purposes of generalization, in the following description, it is assumed that a signaling packet is identified by header information which could be VCI information having a predetermined pattern in a case of a packet having a fixed length format, or a combination of an LCGN and an LCN having a predetermined pattern in a packet having a variable length format.

When the packet origination terminal 260 makes a call which includes bursty data, it first sends a signaling packet having header information S1 specifying a call request from the packet origination terminal to a first node circuit 100. The signaling packet is transmitted in the node circuit 100 to a switching network 150 via a communication line 265.

In the switching network 150, the header information is interpreted and recognized as identifying the packet as a signaling packet. As noted above, the signaling packet includes in addition to a destination address in its header portion, traffic information in its data portion for use in selecting an output line, such as (1) maximum transmission bit rate information and (2) average transmission bit rate information. The switching network 150 sends the signaling packet to a traffic control device 240 via a switching control device 251.

In the traffic control device 240, the above described processes to identify a most appropriate output line are executed, and the traffic control device 240 controls the switching control device 251 to cause the switching network 150 to store the obtained combination of an input line and an output line in its link memory. For example, referring to FIG. 6(a), the switching network 150 contains a link table, L1:(I1;I2) whereby the header I1 of the packets on input line 265 is rewritten to become I2 on output line 275. The entries of the link table are established by the traffic control device as a result of a search of the characteristic table shown FIG. 3(b) which is stored in the traffic control device as described above. Further, the traffic control device 240 rewrites the header of the signaling packet to S2 which designates a signaling packet between two node circuits and sends the signaling packet to the appropriate output line via switching control device 251 and switching network 150.

Figure 6A:
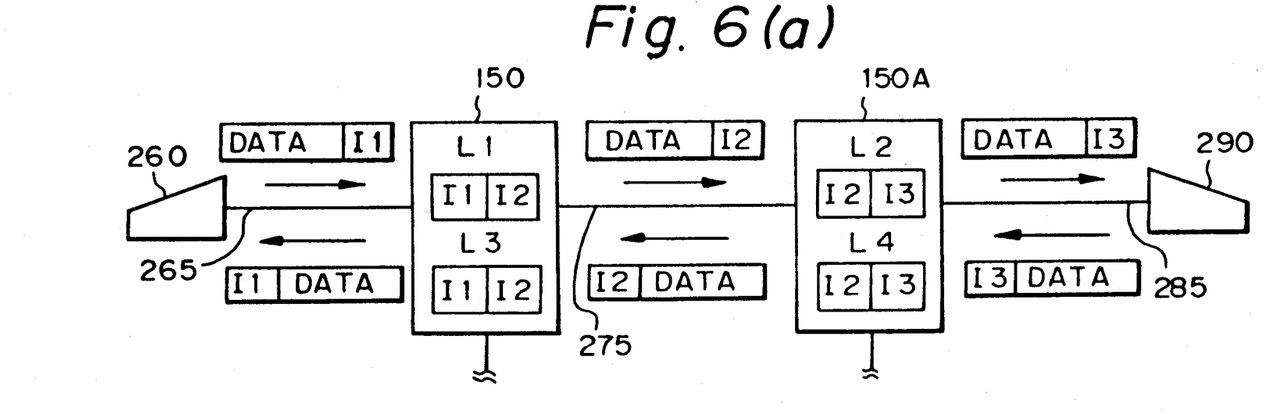
FIG. 6(a) is a data flow diagram illustrating the treatment of pockets transmitted through a node circuit according to the invention.
Figure 6B:
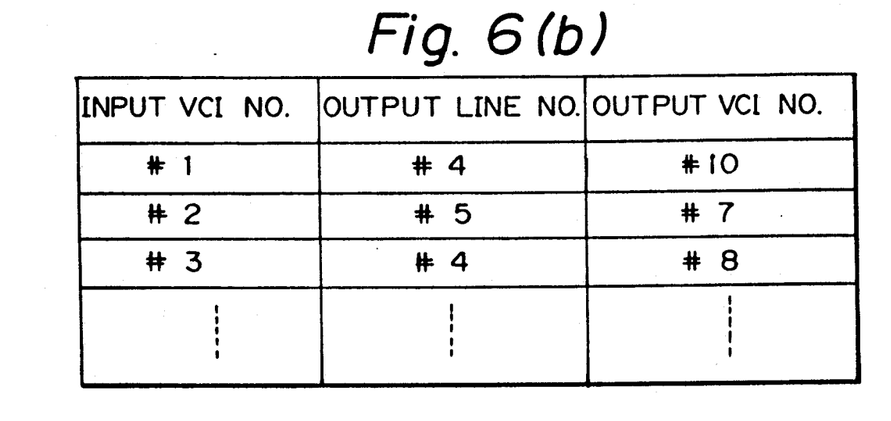
FIG. 6(b) illustrates an example of contents of a link table which is produced in accordance with the invention.

In detail, the corresponding link table for each input line is a virtual table as shown in FIG. 6(b). As described above, every call is identified by the VCI (or LCGN and LCN in the case of a variable length packet transmission). A plurality of calls for each input line and every packet is identified by the VCI. Further, the link table is common to all current calls on the input line and may be located at an input line address in a memory provided in the switching network.

In this figure, for example, calls identified by VCI No. 1 and VCI No. 3 are multiplexed on the same output line No. 4 and converted to VCI No. 10 and No. 8 respectively.

Generally, according to a conventional method, the switching control device assigns an appropriate VCI number to an outgoing packet, which VCI number is not already being used on the selected output line, for sending the incoming packet.

The next node circuit 100A is connected to the node circuit 100 via the communication line 275 and receives the signaling packet having header information S2. In the node circuit 100A, the same processes as those performed in the previous node circuit 100 are performed by a switching network 150A, switching control device 251A, and traffic control device 240A, and another link table L2:(I2;I3) is held in the switching network 150A. The traffic control device 240A rewrites the header of the packet to S3, which designates a signaling packet from a node circuit to a packet destination terminal, and sends the packet to the appropriate output line via switching control device 251A and switching network 150A.

A packet destination terminal 290 is connected to the node circuit 100 via a communication line 285. Terminal 290 receives the signaling packet having header information S3 and returns another "return signaling" packet which has the same header information S3, and has traffic information of the packet destination terminal 290.

Similarly to the transmission of the signaling packet, transmission of the return signaling packet encounters a link table L3:(I1;I2) and a link table L4:(I2;I3) in the switching networks 150 and 150A, respectively.

FIG. 6(a) shows the status of communication with data packets between terminals 260 and 290 during a call. Following processing of the signaling packet, which uses the above link tables. Once those link tables are provided in the communication path for the call, it will be unnecessry to rewrite the tables until the next call request. Therefore, the switching control devices 251, 251A and traffic control devices 240, 240A are released from processing during data transmission of the particular call.

During data transmission, according to their conventional operation, switching networks 150 and 150A automatically transform the header information and VCI information of each arriving packet (which specifies the address from which the arriving packet has come), to specify the node or terminal to which it is arriving according to the entries in the link tables L1, L2, L3, L4 stored in the switching networks. For example, in the embodiment shown in FIG. 6(a), if a packet origination terminal 260 which has address information I1 sends a data packet, which has header (including VCI and address) information I1, that header information is automatically rewritten at each switching network (to I2 and I3 respectively at networks 150 and 150A), on the transmission path. Thus, the packet is transmitted to the destination packet terminal 290 as a packet having header information I3, which specifies the address and VCI information from which the packet has come, thereby to indicate the node or terminal to which it is arriving, according to the entries in the link table L1, L2, L3, L4 stored in the switching networks.

Since the most appropriate output lines are selected by means of the above mentioned processes and the switching control devices and traffic control devices are released during data transmission, it is possible to realize a very fast transmission of bursty data in multimedia communication.

If in a first call the actual bit rate varies only minimally from the effective bit rate, it would generally be safe to maintain the effective bit rate at the same value for future calls originating in the same origination terminal for a particular data source, without substantial added risk of data loss or data transmission inefficiency. However, if there is a large difference between the effective bit rate and actual bit rate of the first call, meaning that the estimate of the average bit rate transmitted in the signaling packet was in error, it would be necessary to adjust the effective bit rate to avoid unintended discarding of packets and/or loss of transmission efficiency caused by the error, in future calls. To improve this situation, the node circuit of the invention includes traffic counting devices to measure the actual input traffic of each call and adjust the effective bit rate for the future calls.

Figure 8:
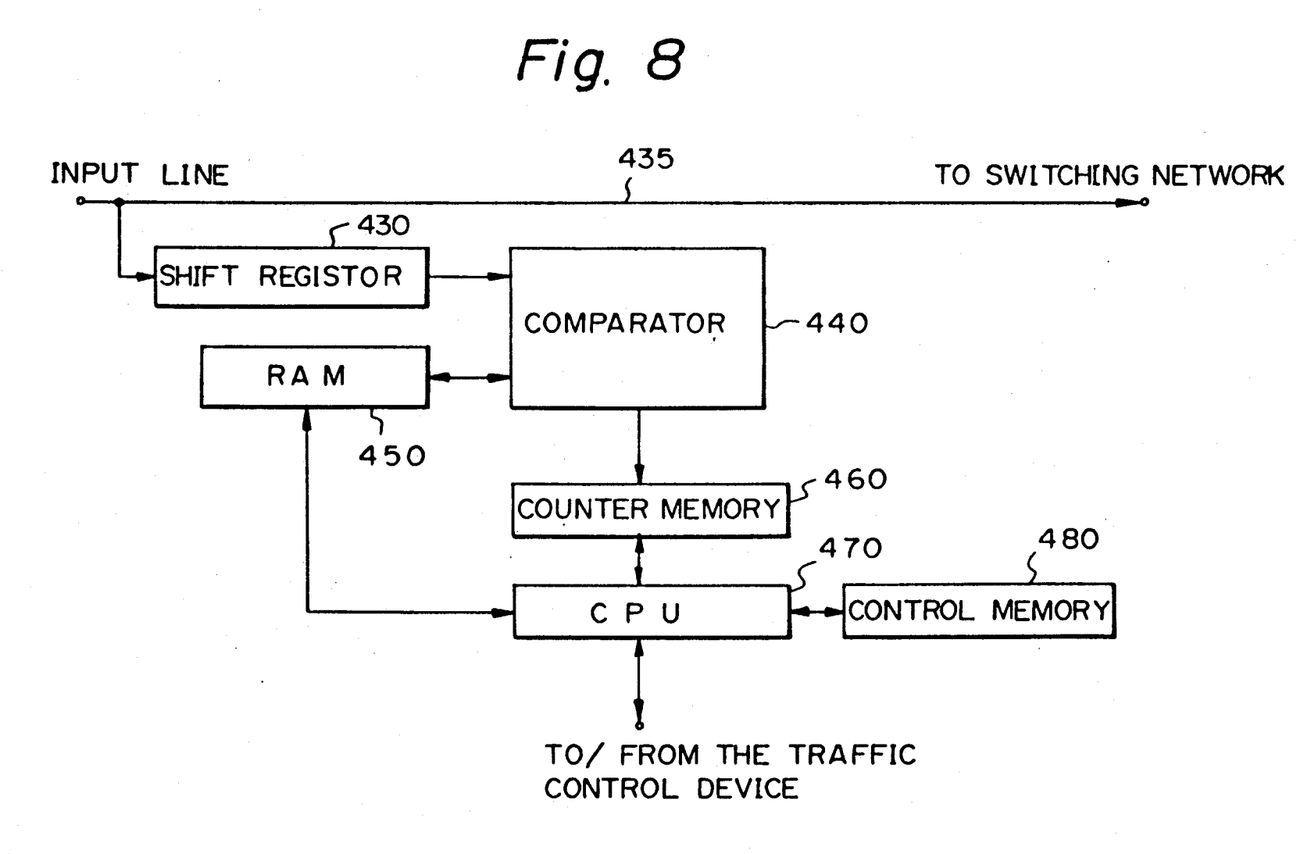
FIG. 8 is a block diagram of one embodiment of a traffic counting device according to the invention for use with packets having a fixed length format.
Figure 9:
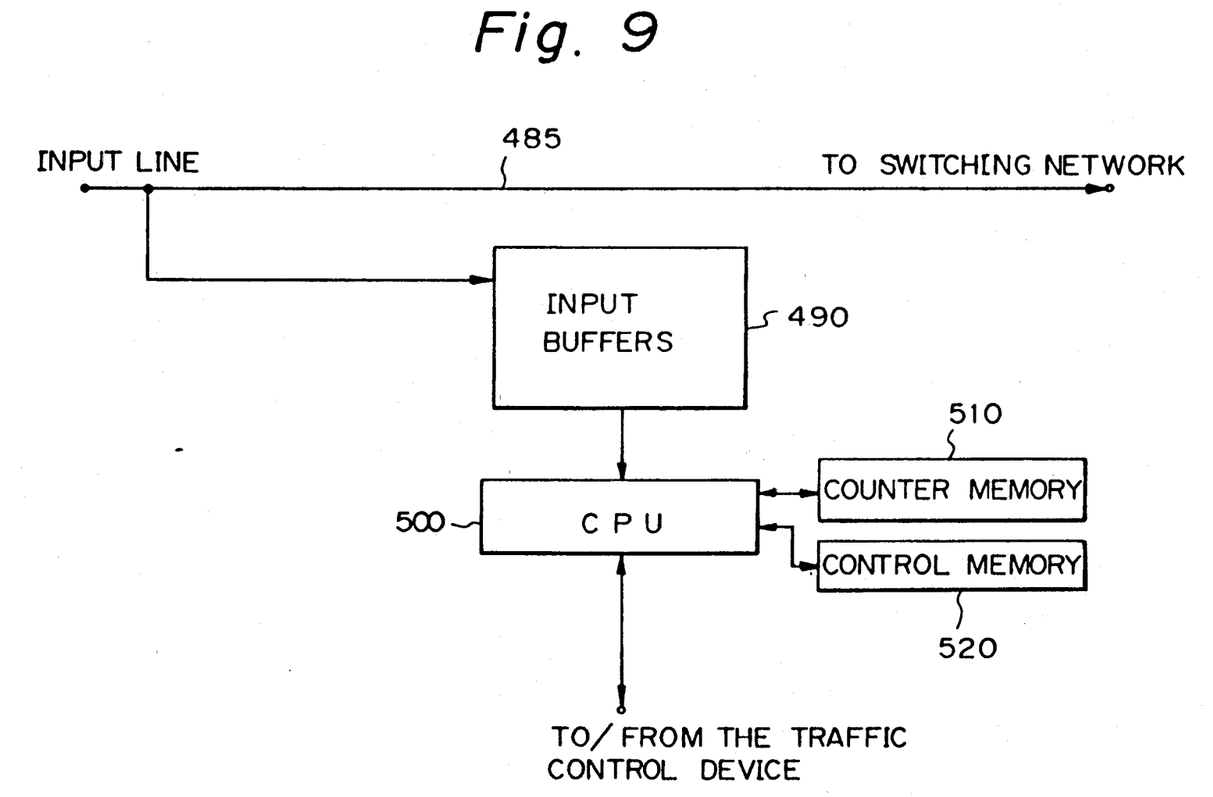
FIG. 9 is a block diagram of another embodiment of the traffic counting device of the invention for use with packet having a variable length format.

The structure of the traffic control devices depends on whether the packet format is a fixed length format or a variable length format. FIG. 8 is an example of a traffic counting device for a fixed length packet format and FIG. 9 is another example for variable length packet format. In FIG. 8, a communication line 435 corresponds to one of the input lines 11-1 to 11-m in FIG. 2. A shift register 430 captures a bit stream from the communication line 435 and transfers it to a comparator 440.

In the comparator 440, the captured bit stream is assembled in a packet form and compared with some predetermined patterns of different types of packets previously written into a RAM 450 by a central processing unit, (hereinafter, CPU) 470. In this way, some types of packets, including, but not limited to empty packets, which can be discarded and should therefore not be counted, are identified. If the comparator 440 detects a "countable" packet, the comparator 440 adds "1" to a corresponding count stored in a counter memory 460. This counting process is applied to each multiplexed call on each line identified by the VCI information. Therefore, a plurality of counts are stored in the counter memory 460.

A control memory 480 comprises a combination of a conventional ROM and RAM for use with the CPU 470, and it stores control software of the traffic counting device and necessary data, for example, the patterns of "countable" packets.

In this embodiment, the control memory 480 stores a unit time for the packet counting. The CPU 470 reads the contents of the counter memory 460 and the unit time in the control memory 480 during a predetermined time interval and computes a number of packets in the unit time separately for each call. The CPU 470 then sends the number of packets in the unit time as to each call to the traffic control device 240.

Figures 7A, 7B:
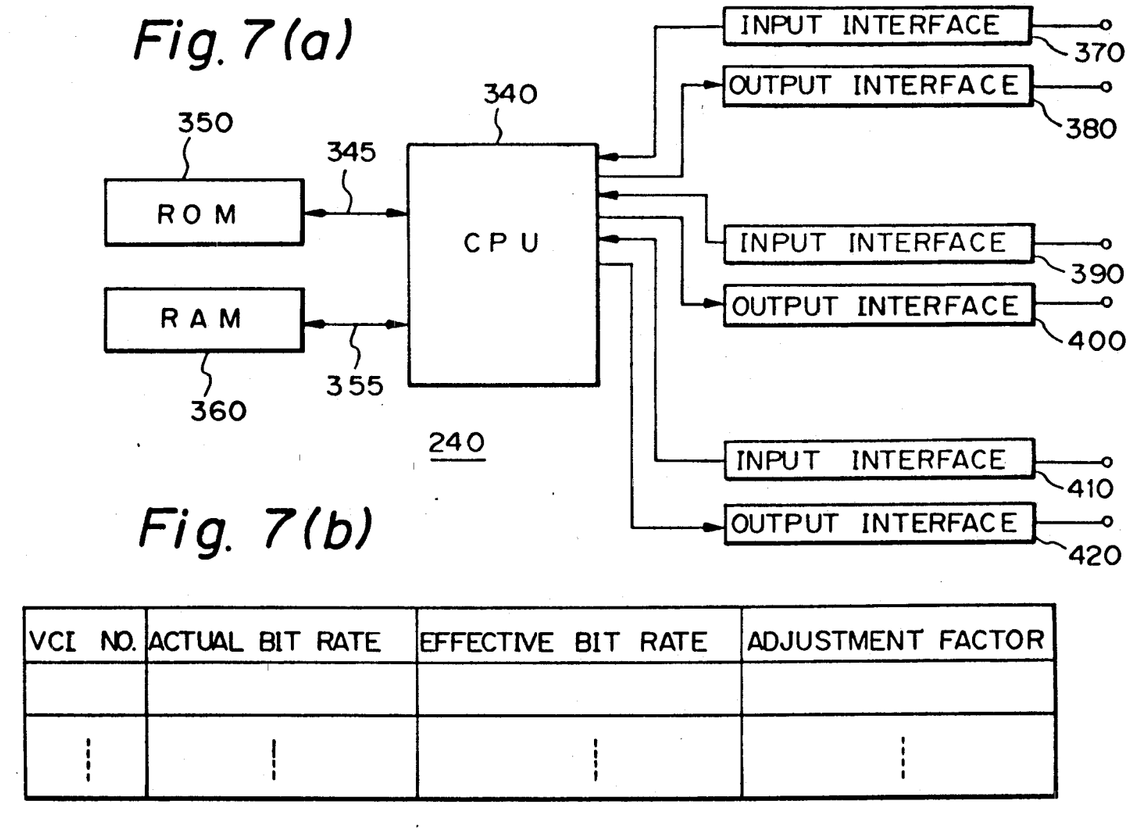
FIG. 7(a) is a block diagram of a traffic control device according to the invention.
FIG. 7(b) illustrates an adjustment table stored in the traffic control device shown in FIG. 7(a).

FIG. 7(a) is a block diagram of the traffic control device 240. The traffic control device 240 includes a CPU 340, a ROM 350, a RAM 360, input/output interfaces 370, 380 for traffic counting devices 12-1 to 12-m, input/output interfaces 390, 400 for the switching control device 251, and input/output interfaces 410, 420 for the control terminal 220.

Operations performed in the RAM 360 are according to the control software in ROM 350. The traffic control device 240 receives a signaling packet from switching control device 251 via the input interface 390 and processes the signaling packet in the CPU 340. It also stores the characteristic, maximum bit rate and effective bit rate tables in its associated RAM 360.

When the CPU 340 receives and processes the signaling packets, the CPU 340 enters the VCI information and effective bit rate in an adjustment table in its associated RAM memory 360, as represented in FIG. 7(b), for every call on every input line. The CPU stores the VCI information and the effective bit rates. Further, when the CPU 340 receives the above mentioned number of packets information and unit time, it computes an actual bit rate and further computes an adjustment factor given, for example, by the actual bit rate divided by the effective bit rate. This factor reflects conditions on a particular line and/or from a particular source (identified by the same VCI number), which may increase or decrease the actual bit rate relative to the previous estimated average bit rate. For example, if the adjustment factor AF, is in the range ($0 < AF < 1$), it could be utilized to reduce the effective bit rate.

The computed adjustment factor is used in subsequent routing procedures when a subsequent call on a particular input line is from the same source at the same packet origination terminal and thus the VCI number is the same. For example, in the next routing procedure on such a call, the traffic control device 240 refers to the adjustment table by the input line number, the adjustment factor is multiplied by the effective bit rate in the effective bit table for a particular call to obtain a new effective bit rate, and the new rate replaces the old rate in the effective bit rate table. The new rate would be expected to more accurately reflect the actual transmission of the output lines.

FIG. 9 is a block diagram of another type of the traffic counting device, designed for counting bits in packets having a variable length packet format. In FIG. 9, a communication line 485 corresponds to one of the input lines 11-1 to 11-m in FIG. 2. An input buffer 490 captures a bit stream from the communication line 485 and transfers it to a CPU 500. Since the format of packets which are to be discarded includes only a flag sequence, it is unnecessary to include a memory which stores a predetermined packet pattern or a comparator circuit which detects the predetermined packet pattern. Rather, a decision only must be made as to whether the packet consists of flags or not. Therefore, the CPU 500 can easily distinguish between a packet to be discarded (mere flag sequence) and a "countable" packet.

On the other hand, since the length of the packet is variable to 4096 octets, it is necessary to count the number of octets in the packet to obtain the actual bit rate. When the CPU 500 recognize a countable packet, it adds "1" to a count held in the counter memory 510, and simultaneously, starts to count the number of octets in the packet. Once the CPU 500 has in this way determined the packet length, it stores the result in the counter memory 510.

In order to determine with which call to associate the data portion of the packet includes, the CPU 500 extracts the LCGN and LCN information to identify the call.

Similarly to the traffic counting device shown in FIG. 8, the counting device shown in FIG. 9 stores a unit time in a control memory 520. In a predetermined interval, the CPU 500 reads the number of packets, packet length, LCGN, LCN information and the unit time, and computes an actual bit rate as to the call having the LCGN and LCN information. The CPU 500 then sends that result to the traffic control device 240 via input interface 370. The traffic control device 240 then executes substantially the same processes as described above for the case of the traffic counting device shown in FIG. 8.

The invention is not limited to apply to only the "Virtual Call" data transmission. For example, in case of a "Permanent Virtual Call", it would be possible to input the maximum bit rate information and the average bit rate information to the memory 360 of the traffic control device 240, using the terminal 220, when a subscriber is registered.

Further, it would be possible to use another unit (other than "bit rate") to represent the input traffic, such as the real number of packets being sent in a unit time instead of each of the "bit rates", in which case it would not be necessary to translate numbers of packets per unit time to bit rates.

It would also be possible to provide the traffic information to the node circuit from another source or with a different packet format. For example, if a fixed length packet format is being used, a usual CR packet whose data field has a predetermined value, and traffic information in the data field, could be used as a signaling packet. Alternatively, if the variable length packet format is used, a packet whose address field "A" or control field "C" has a predetermined value could be used as the signaling packet to provide the traffic information.

Further, if necessary, it would be possible to provide the traffic control device 240 at a location distant from the remaining portions of the node circuit 100, and to provide communication lines between them to realize remote control.

It will be understood that the above description of the present invention is susceptible to various modifications, changes and adaptations, and the same are intended to be comprehended within the meaning and range of equivalents of the appended claims.

What is claimed is:

1. An origination node circuit for routing a data call to a destination node via one of a plurality of output lines, the origination node receiving data calls from at least one input line, each data call including a plurality of packets, each packet including information identifying the call, the data call including traffic data, the traffic data indicative of an estimated data rate of the call, each output line having an available data rate carrying capacity, the circuit comprising:

a traffic control device having means for
determining the available capacity of each output line,
estimating a data rate carrying capacity needed on an output line to carry the call based on the traffic data, and
selecting one of the output lines to carry the call to the destination node based at least in part on the estimate and the available capacities; and a switching network including
means, coupled to said traffic control device, for storing in a link table data associating the call with the input line and the selected output line, and
means, coupled to said storing means and responsive to the identifying information in each packet of the call, for connecting the input line to the selected output line in the link table for transferring each data packet to the destination node on the selected output line.

2. A circuit according to claim 1, further comprising means for counting data of the call to obtain the actual data rate of the call, said traffic control device having means for storing the actual data rate, said traffic control device estimating a data carrying capacity needed on an output line to carry a subsequent call received on said input line based at least in part on the available capacities of the output lines, the stored actual data rate, and the estimated data rate of the subsequent call.

3. A node circuit according to claim 1, wherein the traffic data is a signaling packet which includes destination address information, estimated maximum bit rate information, and estimated average bit rate information.

4. A method of routing from an input line to an output line, a data call to a destination terminal originating at an origination terminal, in a packet switching network, each call including a plurality of packets, each packet including information identifying the call, the method comprising the steps of:

(a) including with the call estimation data indicative of an estimate of a data rate of the call;
(b) receiving the call at a node circuit on the input line;
(c) computing and storing in a memory at the node circuit a first value indicative of a necessary available data rate carrying capacity on an output line to carry the call, based on the estimation data;
(d) selecting from among a plurality of output lines leading to the destination terminal, an output line which has available enough data rate carrying capacity to carry the call, based on the result of the computing;

(e) storing data associating the call, the input line and the selected output line in a link table; and (f) connecting the input line and the selected output line based on the stored data.

5. A method according to claim 4, wherein the call includes a signaling packet containing the estimation data and a bursty data transmission following the signaling packet, and the estimation data represents an estimate of an average data rate for the call and a maximum data rate of the bursty data transmission.

6. A method according to claim 5, further comprising the steps of:

measuring the actual data rate on the input line during the bursty data transmission; and during a succeeding call, computing at the node circuit a necessary capacity to carry on an output line succeeding packets of said succeeding call, based on the measured actual data rate in the preceding call.

7. A method according to claim 4, where the call includes a signaling packet containing the estimation data and at least a destination address, and the estimation data includes estimates of a maximum transmission bit rate and an average transmission bit rate of the call, and said step of computing further comprises the steps of:

preparing a maximum bit rate table whose contents are first addresses in the memory corresponding to respective maximum bit rate values;

storing effective bit rate tables at the first addresses, each effective bit rate table containing:

values of estimated average bit rates and for each estimated average bit rate value, an associated effective bit rate value, all of the effective bit rate values in each bit rate table corresponding to the respective maximum bit rate values;

identifying the address in the maximum bit rate table which corresponds to the maximum bit rate value equal to the estimate of the maximum transmission bit rate in the signaling packet;

accessing with the identified address in the maximum bit rate table, the effective bit rate table at the identified address and identifying in the accessed effective bit rate table the effective bit rate associated with the estimated average bit rate value in the signaling packet; and storing the identified effective bit rate in the memory as the first value.

8. A method according to claim 7, wherein said step of selecting further comprises the steps of:

generating characteristic tables for each of a plurality of destination terminals, each characteristic table containing entries which associate a maximum bit rate, an existing bit rate, and a line identification for each of the output lines leading to the respective destination terminal, and storing the characteristic tables in a memory at corresponding addresses;

generating a destination table containing entries which associate the respective destination terminals with the addresses of the characteristic tables therefore;

identifying the destination terminal to which the call is directed and identifying from the destination table the address in the memory of the characteristic table therefore; and accessing the identified characteristic table and identifying therein one of the lines identified therein on which the difference between the maximum transmission rate and the present transmission rate, according to the identified characteristic table, is greater than the identified effective bit rate.

* * * * *